(12) United States Patent
Anand et al.

(10) Patent No.: US 12,209,644 B2
(45) Date of Patent: Jan. 28, 2025

(54) ENERGY TRANSFER SYSTEM

(71) Applicant: MONTER TECHNOLOGIES PVT. LTD., Pune (IN)

(72) Inventors: Rishabh Sanjeev Anand, Pune (IN); Ankit Singh, Pune (IN)

(73) Assignee: MONTER TECHNOLOGIES PVT. LTD., Pune (IN)

( * ) Notice: Subject to any disclaimer, the term of this patent is extended or adjusted under 35 U.S.C. 154(b) by 316 days.

(21) Appl. No.: 17/295,814

(22) PCT Filed: Jan. 25, 2020

(86) PCT No.: PCT/IN2020/050085
§ 371 (c)(1),
(2) Date: May 20, 2021

(87) PCT Pub. No.: WO2020/157770
PCT Pub. Date: Aug. 6, 2020

(65) Prior Publication Data
US 2022/0025961 A1 Jan. 27, 2022

(51) Int. Cl.
*F16H 1/22* (2006.01)
*F03G 3/08* (2006.01)
*F16H 37/06* (2006.01)
*B62M 6/90* (2010.01)
*F16D 41/00* (2006.01)

(52) U.S. Cl.
CPC .............. *F16H 37/065* (2013.01); *F03G 3/08* (2013.01); *F16H 1/22* (2013.01); *B62M 6/90* (2013.01); *F16D 41/00* (2013.01)

(58) Field of Classification Search
CPC ............ F16H 1/22; F16H 37/065; F03G 3/08; B62M 6/90; F16D 41/00
USPC .................................. 74/665 I, 665 M, 665 N
See application file for complete search history.

(56) References Cited

U.S. PATENT DOCUMENTS

| 598,629 | A | * | 2/1898 | Higgins | |
| 980,909 | A | * | 1/1911 | Bauschlicher | |
| 3,115,936 | A | * | 12/1963 | Blews, Jr. | B64D 35/04 74/665 M |
| 3,748,920 | A | * | 7/1973 | Lambev | F16H 55/10 74/417 |

(Continued)

FOREIGN PATENT DOCUMENTS

| CN | 207069805 | * | 3/2018 |
| GB | 443550 | * | 3/1936 |

*Primary Examiner* — William C Joyce

(57) ABSTRACT

A system of energy transfer comprises rotatable drive input shafts (108) of an input side, each having a drive receiving end (110) and a second end (112). The drive receiving end (110) is operatively connected to multiple drive sources (102). The system further comprises a rotatable drive output shaft (120) of the input side that is coupled to a continuous variable transmission (122) and a planetary gear and is operatively coupled to a pinion (116). The second end (112) is coupled to rolling friction gears (114) that houses a freewheeling clutch (118) acting upon the pinion (116). The rolling friction gears (114) have circular gear teeth that mesh with circular gear teeth of the pinion (116) for transferring rotating movements of the multiple rotatable drive input shafts (108) of the input side into the rotating movement of the rotatable drive output shaft (120) of the input side.

6 Claims, 2 Drawing Sheets

(56) References Cited

U.S. PATENT DOCUMENTS

| | | | | |
|---|---|---|---|---|
| 4,783,023 A | * | 11/1988 | Jupe | B64C 27/12 |
| | | | | 244/6 |
| 4,944,196 A | * | 7/1990 | Rivin | F16H 55/17 |
| | | | | 74/462 |
| 8,074,758 B2 | * | 12/2011 | Angeletti | B60K 17/24 |
| | | | | 180/165 |

* cited by examiner

ENERGY TRANSFER SYSTEM

FIELD OF DISCLOSURE

The present disclosure relates to an energy transfer system, and specifically relates to the energy transfer system for transferring rotating movements of multiple rotary inputs into rotating movements of multiple rotary outputs.

BACKGROUND

Energy is generated using conventional sources like oil, gas, and coal, or using non-conventional sources like wind, solar, tides, and biomass. The generated energy is always required to be transferred from one end to other. Energy transfer systems are capable of transferring one or more forms of energy for driving one or more outputs, such as an alternator, a wheel, or a turbine.

The energy transfer systems employ gearboxes and transmission elements to transfer energy from the input to the output. Sliding friction gears are popular and majorly used in the energy transfer systems. However, loss of energy in such gears is higher as the sliding of the gears creates friction that translates into the heat. This ultimately reduces energy transmission efficiency of the overall system.

The existing gear mechanisms employed in the energy transfer systems can transfer energy from maximum two inputs to maximum two outputs at different rates, i.e., a differential. However, when the energy transfer systems have energy inputs more than two, the system becomes complicated as well as inefficient just by increasing the number of differentials used in the system.

Further, the existing non-conventional energy generating systems have a problem of meeting peak energy generation when the energy demand is at peak. This results in imbalance between peak demand and energy production, the phenomena, which is generally referred as 'duck curve'.

The present disclosure is directed to alleviate one or more limitations stated above or any other limitations associated with the conventional systems.

SUMMARY

This summary is provided to introduce aspects related to an energy transfer system and the aspects are further described below in the detailed description. This summary is not intended to identify essential features of the claimed subject matter nor is it intended for use in determining or limiting the scope of the claimed subject matter.

In one non-limiting embodiment of the present disclosure, an energy transfer system is disclosed. The system includes a plurality of rotatable input shafts that have a first end and a second end. Each of the first end is operatively coupled to a plurality of drive sources. The system also includes a plurality of rotatable output shafts that are operatively coupled to a pinion. The system includes a plurality of rolling friction gears that are coupled to the second end of the plurality of the rotatable input shafts. The plurality of rolling friction gears have circular gear teeth that mesh with circular gear teeth of the pinion. This meshing causes transfer of rotating movements of the plurality of the rotatable input shafts into rotating movements of the plurality of the rotatable output shafts. Each of the plurality of the rolling friction gears houses a freewheeling clutch acting upon the pinion.

In an embodiment of the disclosure, the plurality of drive sources includes at least one of a pedal, a solar panel, regenerative braking, wind, and fluid.

In an embodiment of the disclosure, the rotatable input shafts are coupled to the plurality of drive sources through at least one of a turbine, a wheel, a sprocket, and a motor.

In an embodiment of the disclosure, the plurality of rotatable output shafts is coupled to at least one of a continuous variable transmission and a planetary gear.

In an embodiment of the disclosure, the plurality of rolling friction gears are at least one of rolling friction spur gears, rolling friction helical gears, rolling friction bevel gears, and rolling friction rack and pinion gears.

In an embodiment of the disclosure, the meshing of the circular gear teeth of the rolling friction gears with the circular gear teeth of a pinion form a single point of friction contact, thereby transmitting rotating movements of the rotatable input shafts to the rotatable output shafts.

In an embodiment of the disclosure, the energy transfer system includes a flywheel that is coupled to the rotatable output shafts. The flywheel stores energy generated by the plurality of the drive sources.

In an embodiment of the disclosure, the freewheeling clutch selectively engages and disengages the rotatable input shafts and the pinion.

In an embodiment of the disclosure, the freewheeling clutch is operatively interposed between the rotatable input shafts and the pinion to effect driving engagement therebetween. The freewheeling clutch disengages the rotatable input shafts and the pinion for freewheeling operation when the pinion overruns the rotatable input shafts.

The foregoing summary is illustrative only and is not intended to be in any way limiting. In addition to the illustrative aspects, embodiments, and features described above, further aspects, embodiments, and features will become apparent by reference to the drawings and the following detailed description.

OBJECTS OF THE DISCLOSURE

Some of the objects of the system of the present disclosure are aimed to ameliorate one or more problems of the prior art or to at least provide a useful alternative and are listed herein below.

An object of the present disclosure is to provide an energy transfer system that transfers rotational movements of the multiple inputs into rotational movements of the multiple outputs.

Another object of the present disclosure is to provide an energy transfer system that reduces the transmission losses and improves energy transmission efficiency of the overall system.

Yet another object of the present disclosure is to provide an energy transfer system that meets peak energy generation when the energy demand is at peak.

Yet another object of the present disclosure is to provide an energy transfer system that is efficient, uncomplicated, and cost-effective.

Other objects and advantages of the present disclosure will be more apparent from the following description when read in conjunction with the accompanying figures, which are not intended to limit the scope of the present disclosure.

BRIEF DESCRIPTION OF ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
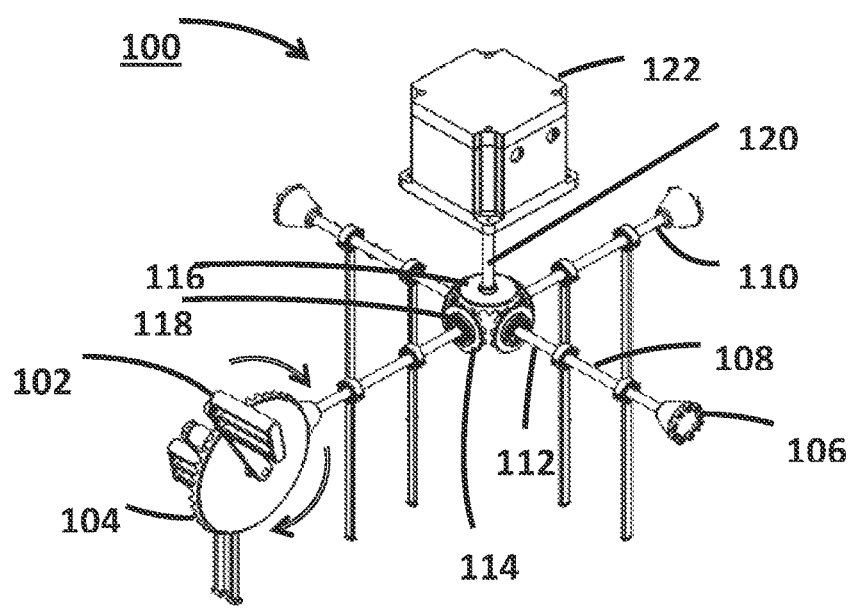
FIG. 1 illustrates a perspective view of an input side of an energy transfer system, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

An energy transfer system will now be described with reference to the accompanying drawings, which do not restrict the scope and ambit of the present disclosure. The description is provided purely by the way of illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments of the present disclosure disclose an energy transfer system. The system allows transfer of energy from multiple rotatable inputs to multiple rotatable outputs. The rotatable inputs may comprise inputs from drive sources, such as a pedal of a cycle, regenerative braking, a solar panel, a wind, or a fluid. The rotatable outputs may comprise a continuous variable transmission or a planetary gear.

The system comprises rolling friction gears that are coupled to the rotatable inputs through drive inputs shafts. The rolling friction gears are configured to accumulate energy from the multiple rotary inputs.

The system may also comprise a flywheel as an intermediate energy storage device. The flywheel may be configured to be accommodated between the multiple rotatable inputs and the multiple rotatable outputs. The flywheel is accelerated by the mechanical energy obtained from the multiple rotatable inputs.

The terms "comprises", "comprising", or any other variations thereof used in the specification, are intended to cover a non-exclusive inclusion, such that an assembly that comprises a list of components or steps does not include only those components or steps but may include other components or steps not expressly listed or inherent to such setup or method. In other words, one or more elements in an assembly proceeded by "comprises . . . a" does not, without more constraints, preclude the existence of other elements or additional elements in the assembly.

Henceforth, the present disclosure is explained with the help of one or more figures of exemplary embodiments. However, such exemplary embodiments should not be construed as limitation of the present disclosure. In the figures, assembly of the energy transfer system on to a vehicle is not depicted for the purpose of simplicity. One skilled in the art would appreciate that the energy transfer system of the present disclosure may be employed in any vehicle including but not limiting to a two wheeled vehicle, a three wheeled vehicle, a four wheeled vehicle, and the like.

The following paragraphs describe the present disclosure with reference to FIGS. 1-4. In the figures, the same element or elements which have similar functions are indicated by the same reference signs.

In an embodiment of the present disclosure, an input side of an energy transfer system 100 is disclosed in FIG. 1. The system 100 comprises a plurality of drive sources 102. FIG. 1 depicts a drive source in a form of pedal. However, it is to be understood that any number of drive sources may be employed in the system 100 of the present disclosure. The drive sources 102 may include at least one of the pedal, a solar panel, regenerative braking, wind, fluid, or the like.

A plurality of drive members 104 may be coupled to the each of the plurality of the drive sources 102. In an embodiment of the present disclosure, the pedals may be used as the drive sources 102. The pedals may rotate the drive members 104. In an example, a crank may be used as the drive member 104. The drive member 104 may have a plurality of teeth formed on a perimeter. These teeth may mesh with teeth of a gear 106 to rotate the gear 106 at speed equal to the speed of rotation of the drive member 104.

The system 100 may comprise a plurality of drive input shafts 108 rotatable about their axis. A drive receiving end 110 of each of the rotatable drive input shafts 108 may be connected to the gear 106. This connection, in turn, couples the each of the rotatable drive input shafts 108 to each of the drive members 104, respectively. Thus, torque is delivered from the drive members 104 to the rotatable drive input shafts 108. This, in turn, causes the rotatable drive input shafts 108 to rotate about their axis in either one direction or the other. A second end 112 of each of the rotatable drive input shafts 108 may be connected to each of a plurality of a rolling friction gears 114.

The rolling friction gears 114 may be employed as at least one of spur gears, helical gears, bevel gears, a rack and pinion gears, or a combination thereof. The rolling friction gears 114 may have teeth formed on a perimeter. The teeth of the rolling friction gears 114 mesh with teeth of a pinion 116. The meshing establishes a single point of friction contact that allows transfer of energy from the rolling friction gears 114 to the pinion 116. In comparison with sliding friction gears, use of the rolling friction gears reduces the transmission losses and improves energy transmission efficiency. This is majorly due to the number of frictional contacts made with the pinion while rotating the gears. In sliding friction gears, the gears establish eight points of frictional contacts with the pinion. Consequently, the transmission losses are higher in the sliding friction gears.

Each of the plurality of the rolling friction gears 114 may house a freewheeling clutch 118. The freewheeling clutch 118 is operatively interposed between the rotatable drive input shafts 108 and the pinion 116 to effect driving engagement therebetween. The freewheeling clutch 118 disengages these members for freewheeling operation when the pinion 116 overruns the rotatable drive input shaft 108. The disengagement and engagement of the freewheeling clutch 118 may require a separate timing sensor (not shown) in order to time the disengagement and engagement. The timing sensor ensures that the teeth of the rolling friction gears 114 do not crack or break due to torque present in the rolling friction gears 114.

The freewheeling clutch 118 ensures that the pinion 116 turns at speed higher than the rotating speed of the rolling friction gears 114 or the rotatable drive input shafts 108. The combination of the rolling friction gear 114 with the freewheeling clutch 118 allows accumulation of energy from all the rotatable drive input shafts 108, even when the rotational speed of one of one input shaft is lesser than the rotational speed of the other input shafts.

The accumulated energy at each of the rolling friction gears 114 is transferred to a rotatable drive output shaft 120 that is operatively coupled to the pinion 116. The rotatable drive output shaft 120 may be coupled to a plurality of driven sources. The driven sources may comprise of continuous variable transmission 122 and a planetary gear assembly. Alternatively, the rotatable drive output shaft 120 may be coupled to a flywheel (not shown) to store the energy generated by the plurality of drive sources. The energy stored in the flywheel may be used at the later stage to fulfill peak demand of the energy.

Figure 2:
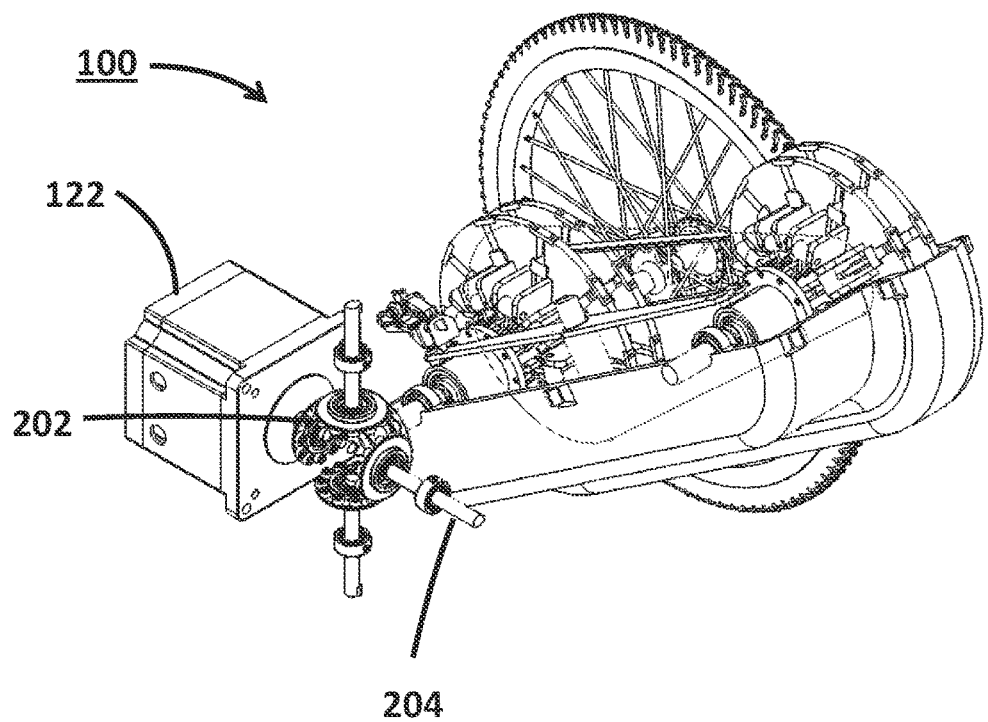
FIG. 2 illustrates a perspective view of an output side of an energy transfer system, in accordance with an embodiment of the present disclosure.

FIG. 2 illustrates a perspective view of an output side of an energy transfer system 100, in accordance with an embodiment of the present disclosure. The system 100 depicts that a rotatable output shaft 202 of the continuous variable transmission 122 may be coupled to a plurality of rotatable input shafts 204. The input shafts 204 may further drive a plurality of output applications, such as a wheel, a turbine, an alternator, or the like.

Figure 3:
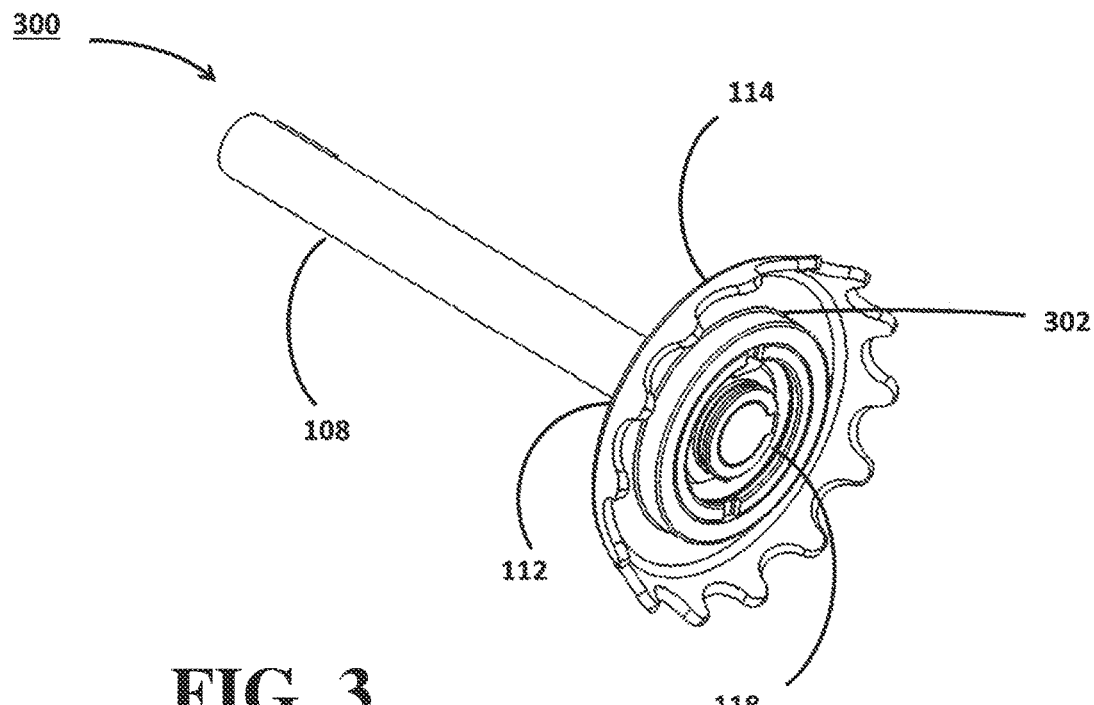
FIG. 3 illustrates a view of a sub assembly, wherein a rolling friction gear is coupled to a rotatable shaft, in accordance with an embodiment of the present disclosure.

FIG. 3 illustrates a view of a sub assembly 300, wherein the rolling friction gear 114 is coupled to the rotatable drive input shaft 108, in accordance with an embodiment of the present disclosure. As shown, the freewheeling clutch 118 may be connected at the second end 112 of the rotatable drive input shaft 108 and may be housed within an inner periphery 302 of the rolling friction gear 114. When used at the input side of the system 100, the freewheeling clutch 118 may be mounted in a way that an outer race is the overrunning member or freewheeling member. When used in the output side of the system 100, the freewheeling clutch 118 may be mounted in a way that an inner race is the overrunning member or freewheeling member. In an exemplary embodiment of the present disclosure, four rolling friction gears are meshed with the pinion, wherein each of the rolling friction gears is spaced at a right angle with respect to each other. It may be understood that the diameter of the pinion can be increased so as to mesh n-number of the rolling friction gears spaced apart equally at a predetermined angle.

Figure 4:
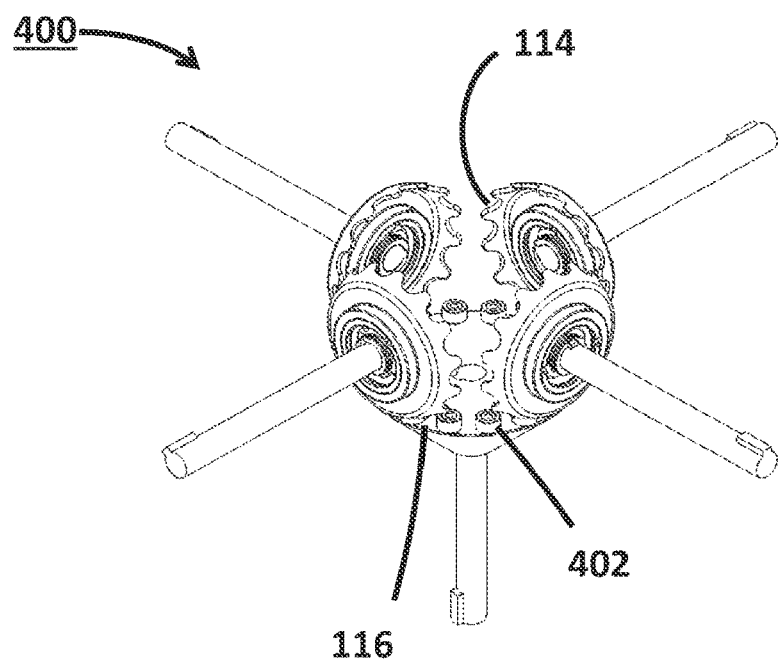
FIG. 4 illustrates a view of a sub assembly, wherein a plurality rolling friction gears are meshed with a pinion, in accordance with an embodiment of the present disclosure.

FIG. 4 illustrates a view of a sub assembly 400, wherein the plurality of rolling friction gears 114 are meshed with the pinion 116, in accordance with an embodiment of the present disclosure. In an exemplary embodiment of the present disclosure, teeth of four rolling friction gears 114 are meshed with the teeth of the pinion 116. The pinion 116 may include a plurality of roller bearings 402 attached on the periphery with an angle perpendicular to an axis of the rotation of the pinion 116. It may be understood that any number of rolling friction gears may be meshed with the pinion, based upon the size of the pinion. Also, an angle between each of the rolling friction gears depend upon the size of the pinion and the number of rolling friction gears meshed with the pinion.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding the description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together. A and C together, B and C together, and/or A, B, and C together, etc.). It will be further understood by those within the art that virtually any disjunctive word and/or phrase presenting two or more alternative terms, whether in the description, or drawings, should be understood to contemplate the possibilities of including one of the terms, either of the terms, or both terms. For example, the phrase "A or B" will be understood to include the possibilities of "A" or "B" or "A and B".

While various aspects and embodiments have been disclosed herein, other aspects and embodiments will be apparent to those skilled in the art. The various aspects and embodiments disclosed herein are for purposes of illustration and are not intended to be limiting, with the true scope being indicated in the description.

Technical Advancements and Economic Significance

The present system offers solution to the existing problems by transferring energy from the multiple inputs to the multiple outputs. The system also reduces the transmission losses and improves energy transmission efficiency of the overall system. Furthermore, the system meets peak energy generation when the energy demand is at peak. This solves the problem of "duck curve". The energy transfer system is efficient, uncomplicated, and cost-effective.

| Description | Reference Number |
|---|---|
| energy transfer system | 100 |
| drive sources | 102 |
| drive members | 104 |
| Gear | 106 |
| Rotatable drive input shafts | 108 |
| drive receiving end of rotatable drive input shaft | 110 |
| second end of rotatable drive input shaft | 112 |
| rolling friction gears | 114 |
| Pinion | 116 |
| freewheeling clutch | 118 |
| rotatable drive output shaft | 120 |
| Continuous variable transmission | 122 |
| rotatable output shaft | 202 |
| rotatable input shafts | 204 |
| sub assembly | 300, 400 |
| inner periphery of the rolling friction gear | 302 |
| roller bearings | 402 |

What is claimed is:

1. An energy transfer system, comprising:
a plurality of rotatable drive input shafts of an input side, each having a drive receiving end and a second end, the drive receiving end being operatively coupled to a plurality of drive sources;
a rotatable drive output shaft of the input side that is coupled to one of a continuous variable transmission, a flywheel, or a planetary gear and is operatively coupled to a pinion;
a plurality of rolling friction gears coupled to the second end of the plurality of the rotatable drive input shafts of the input side, the plurality of rolling friction gears having circular gear teeth that mesh with circular gear teeth of the pinion for transferring rotating movements of the plurality of the rotatable drive input shafts of the input side into rotating movement of the rotatable drive output shaft of the input side, wherein each of the plurality of the rolling friction gears houses a freewheeling clutch acting upon the pinion, wherein the plurality of rolling friction gears with the freewheeling clutch enables an accumulation of energy from the plurality of rotatable drive input shafts, even when the rotational speed of one of the plurality of rotatable drive input shafts is lesser than the rotational speed of the other rotatable drive input shafts by selectively engaging and disengaging the plurality of rotatable drive input shafts on the input side and the pinion, wherein the freewheeling clutch disengages a rotatable input shaft and the pinion for freewheeling operation when the pinion overruns that rotatable input shaft, wherein the energy transfer system is connected a rotatable output shaft of an output side for transmitting the rotating movement of the rotatable drive output shaft of the input side, wherein the rotatable output shaft of the output side is coupled a plurality of rotatable input shafts of the output side that drives a plurality of driven sources for storing energy generated from the rotating movement of the rotatable drive output shaft of the input side or providing the energy generated from the rotating movement of the rotatable drive output shaft of the input side to a generator.

2. The energy transfer system as claimed in claim 1, wherein the plurality of drive sources includes one of a pedal, a solar panel, regenerative braking, wind, and fluid.

3. The energy transfer system as claimed in claim 1, wherein the rotatable drive input shafts of the input side are coupled to the plurality of drive sources through one of a turbine, a wheel, a sprocket, and a motor.

4. The energy transfer system as claimed in claim 1, wherein the plurality of rolling friction gears are one of rolling friction spur gears, rolling friction bevel gears, and rolling friction rack and pinion gears.

5. The energy transfer system as claimed in claim 1, wherein the circular gear teeth of the rolling friction gears are meshed with the circular gear teeth of a pinion form a single point of friction contact, thereby transmitting rotating movements of the rotatable drive input shafts of the input side to the rotatable drive output shaft of the input side.

6. The energy transfer system as claimed in claim 1, wherein the freewheeling clutch is operatively interposed between each of the plurality of the rotatable drive input shafts of the input side and the pinion to effect driving engagement there between and to disengage the plurality of the rotatable drive input shafts of the input side and the pinion for freewheeling operation when the pinion overruns the plurality of the rotatable drive input shafts of the input side.

* * * * *